July 14, 1970 R. G. MANKARIOUS 3,520,741

METHOD OF SIMULTANEOUS EPITAXIAL GROWTH AND ION IMPLANTATION

Filed Dec. 18, 1967 2 Sheets-Sheet 1

Ramzy G. Mankarious,
INVENTOR.
BY.
W. Hume Ollister Jr.
ATTORNEY.

Ramzy G. Mankarious,
INVENTOR.
BY.
W. Hursc Allister Jr
ATTORNEY.

United States Patent Office 3,520,741

Patented July 14, 1970

3,520,741

METHOD OF SIMULTANEOUS EPITAXIAL GROWTH AND ION IMPLANTATION

Ramzy G. Mankarious, Costa Mesa, Calif., assignor to Hughes Aircraft Company, Culver City, Calif., a corporation of Delaware Filed Dec. 18, 1967, Ser. No. 691,521
Int. Cl. H01l 7/54
U.S. Cl. 148—175 4 Claims

ABSTRACT OF THE DISCLOSURE

Method of epitaxially growing a semiconductor film while simultaneously introducing conductivity-type-determining impurities therein by ion implantation to establish selectively discrete regions, if desired, by a particular type of conductivity and of a particular geometry and arrangement.

This invention relates to semiconductor devices and to methods for fabricating the same. More particularly, the invention relates to methods for selectively establishing the conductivity type of a layer of semiconductor material which is being deposited or grown epitaxially upon a substrate.

The epitaxial method of growing semiconductive material upon a substrate crystal is well known. As used herein, epitaxial growth refers to the growth of layers of semiconductive material upon a substrate crystal in which the growing layer is an extension of the substrate crystal and in which the same crystal structure or order is maintained. The conductivity type of the growing layer may be varied as by the inclusion therein of different conductivity-type-determining impurities.

The epitaxial process has generally been practiced by depositing atoms of the semiconductor material from the vapor phase thereof upon the substrate crystal. One technique to form silicon or germanium layers epitaxially is by the reduction by hydrogen of silicon tetrachloride or germanium tetrachloride, usually at atmospheric pressure. Another technique, hereinafter called the vapor-deposition epitaxial process, is to evaporate elemental silicon or germanium in vacuum and to deposit the atoms thereof from the vapor phase onto a silicon or germanium substrate to thereby grow epitaxially layers of these elements thereon. In either technique, selective impurity addition or doping is achieved by introducing doping gases (or conductivity-type-determining impurities in the vapor phase) such as phosphorus trichloride or boron trichloride or elemental arsenic, phosphorus or boron into the reaction chamber where epitaxial growth is occurring. These doping gases contribute atoms of arsenic phosphorus or boron which constitute the electrically significant element or conductivity-type-determining impurity for addition to the semiconductor lattice being grown epitaxially.

Despite the usefulness and versatility of the epitaxial growth technique, one variation which prior to the present invention could not be attained by either technique, except perhaps by elaborate and difficult-to-control masking procedures, was the fabrication of an epitaxial layer having selected or discrete portions thereof doped according to some pre-desired conductivity scheme. By the epitaxial growth methods as presently practiced, only wholly and uniformly doped epitaxial layers can be formed. It is, of course, possible to form multiple layers of different conductivity type, but each layer is completely and uniformly doped. In other words, selective partial doping of a growing epitaxial layer is not possible according to procedures of the prior art. Even the use of mask is not a very feasible technique to preclude doping at particular areas since such masking also precludes or interferes with epitaxial growth at the masked areas. Hence, heretofore the prior art was only able to provide epitaxially grown layers having selected regions of a particular type of conductivity achieved by utilizing a two-or-three step process in which the epitaxial layer was first grown, then masked as by an oxide layer to expose selected portions of the epitaxial layer, and then subjected to a diffusion process whereby the desired conductivity-type-determining impurity was introduced through openings in the oxide mask to convert or establish the desired conductivity type.

It is therefore an object of the instant invention to provide an improved method for epitaxially growing a layer of semiconductor material having preselected discrete areas of a predetermined conductivity type.

Another object of the invention is to provide an improved method for epitaxially growing a layer of semiconductor material while simultaneously imparting a preselected type of conductivity to discrete areas or portions of the layer.

Yet another object of the invention is to provide an improved method for epitaxially growing a layer of semiconductor material while simultaneously doping preselected discrete areas or portions of the layer.

These and other objects and advantages of the invention are accomplished by implanting ions of a conductivity-type-determining impurity in a layer being grown epitaxially by the vapor-deposition technique. The ions are introduced or implanted into preselected portions of the growing epitaxial layer by irradiating or bombarding such portions with a beam of ions of conductivity-type-determining material. The ion beam is capable of being readily controlled as to size and trajectory. Hence, areas of any size and shape of the growing epitaxial layer may be doped as desired by subjecting such areas to such ion implantation. The ion beam may be scanned or otherwise controlled so as to impinge only on the areas where doping or implantation is desired.

The invention will be described in greater detail by reference to the drawings in which.

Figures 6A, 6B, 6C:
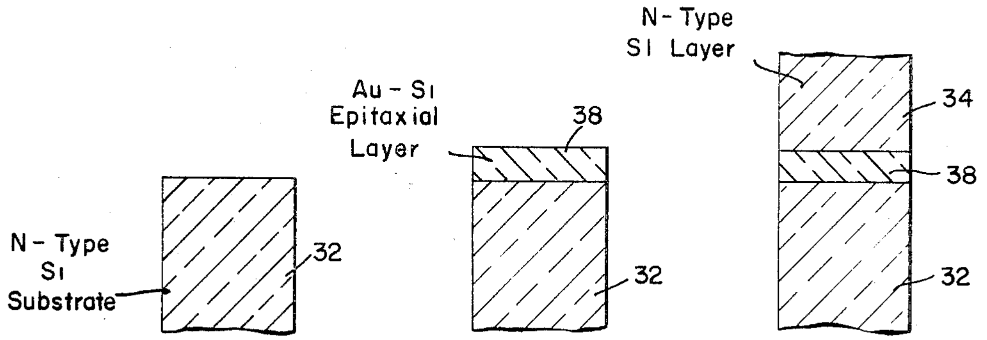
Figure 7:
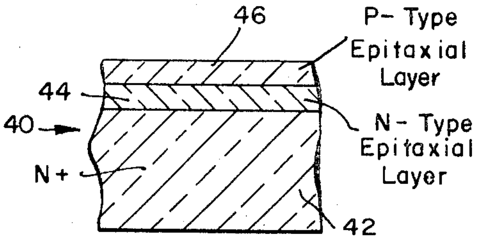
Figure 8:
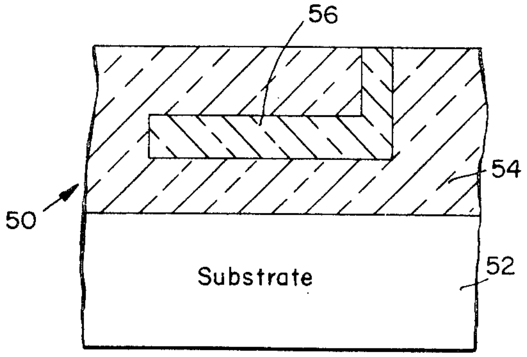
Figure 9A:
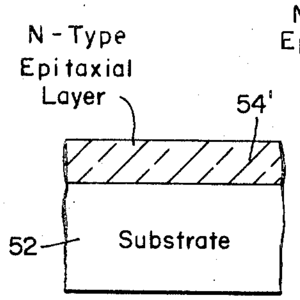
Figure 9B:
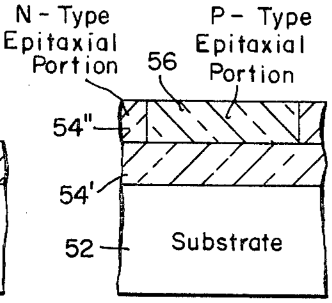
Figure 9C:
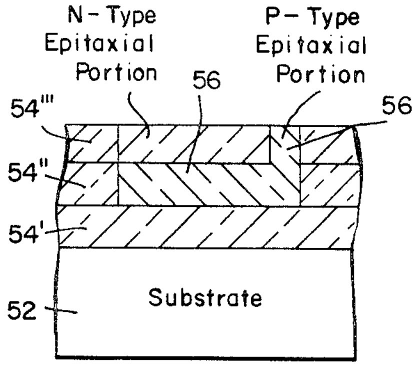

FIGS. 6(*a*), 6(*b*) and 6(*c*) are partial, cross-sectional elevational views of a metal-base transistor in various phases of fabrication according to the process of the invention;

FIG. 7 is a partial, cross-sectional elevational view of a variable capacitance or varactor diode fabricated according to the process of the present invention;

FIG. 8 is partial, cross-sectional elevational view of an epitaxially-grown layer of semiconductor material having a given type of conductivity and an internal or buried region therein of opposite conductivity type; and FIGS. 9(*a*), 9(*b*) and 9(*c*) are partial, cross-sectional elevational views illustrating various phases in the fabrication of the epitaxially-formed structure of FIG. 8 according to the process of the present invention.

Figure 1:
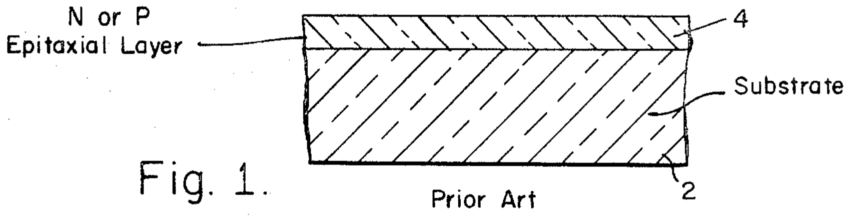
FIG. 1 is a partial, cross-sectional, elevational view of a semiconductor layer epitaxially-grown on a substrate according to the prior art.

With reference to FIG. 1 a brief description of the epitaxial growth process and the products producible thereby according to the prior art will first be described. While the epitaxial growth process and the process of the invention can both be practiced with respect to semiconductor materials such as germanium and silicon, the process will be described with particular reference to silicon for illustrative purposes. In FIG. 1 a substrate 2 of silicon is shown. This substrate may be of any desired conductivity type and of any desired resistivity. It will be understood that the silicon substrate 2 is of single crystalline structure. Disposed on the upper surface of the substrate 2 is an epitaxial layer 4 likewise of silicon and of any desired conductivity type and resistivity. Thus, the epitaxial layer 4 may be either of N-type or P-type conductivity. The epitaxial layer 4 may be produced by the following process which may also be practiced in connection with the present invention.

The first step is to process the surface of the substrate 2 so that it will present a substantially undamaged crystal surface upon which epitaxial growth is desired. To this end the upper surface of the substrate is carefully polished, etched and cleaned. Accordingly, the upper surface of the substrate 2 may be ground flat with 1800 silicon carbide, then etched by a counter-current-flow method in a mixture of concentrated nitric acid and 5% hydrochloric acid, and then cleaned in hydrochloric acid and washed with deionized water.

The substrate 2 is then mounted in an evacuated chamber in which is provided a source of pure silicon in a crucible or boat adapted to be heated. The temperature of the substrate may then be raised to at least about 800° C. but below the melting point of silicon (1420° C.). The silicon source is heated to at least the temperature at which silicon vaporizes (1420° C. or higher). In the case of germanium, the substrate temperature is at least about 600° C. and below the melting point of germanium (about 960° C.) While the germanium source is heated to the temperature which germanium vaporizes (960° C. or higher).

The epitaxial film 4 is deposited uniformly on all surfaces of the substrate which are exposed to the vapor of the semiconductor material. However, only the film on the upper prepared surface of the substrate is of interest in connection with the method of the present invention. The epitaxial film 2 is of high quality single crystal material having the same orientation as the substrate. This is the arrangement encompassed by the term "epitaxial growth or deposition." The formation of the film is a result of the atoms of the semiconductor material depositing and assuming the proper position in the semiconductor lattice structure.

The conductivity type of the epitaxial film 4 produced by the method just described is generally N-type. The resistivity of the film thus formed is relatively high and in the absence of an added significant impurity during the process, the resistivity of the grown film will be about 100 ohm-centimeters. Different resistivities and different conductivity types have been obtained heretofore by introducing within the vapor deposition chamber a significant conductivity-type-determining impurity. Thus, boron and phosphorus (or arsenic) are typically satisfactory materials for inducing P and N-type conductivity in the growing epitaxial film. In general, the various impurities or dopants known in the art for diffusant sources are likewise satisfactory. When a dopant or conductivity-type-impurity is used, the entire epitaxial layer 4 grown by this process will be of uniform conductivity type and resistivity. In other words, by these techniques there is no practical method for preventing the uniform doping of a growing epitaxial layer. This follows since it will be understood that vapors containing the conductivity-type-determining impurity are introduced into the vapor-deposition chamber where the epitaxial film is growing and this growing film is entirely exposed to the doping action of the conductivity-type-determining impurity. Thus, an epitaxial layer having discrete regions of conductivity type such as shown in FIG. 2, for example, could not be formed prior to the process of the present invention.

Figure 2:
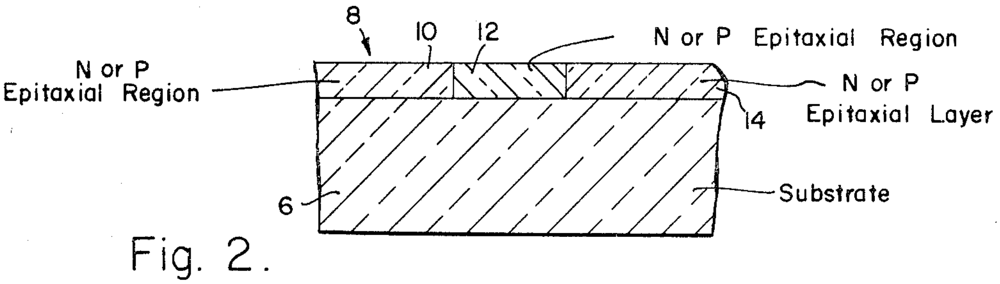
FIG. 2 is a partial, cross-sectional, elevational view of a semiconductor layer epitaxially-grown on a substrate according to the method of the present invention.

In FIG. 2, a silicon substrate 6 of a single crystalline material is shown having an epitaxial-grown layer 8 disposed on a surface thereof. The epitaxial layer 8 includes regions 10, 12 and 14 which may be of any desired type of conductivity. For example, the regions 10 and 14 of the epitaxial layer 8 may be of N-type conductivity. The region 12 may be of P-type conductivity. According to the process of the present invention the region 12 may be of any desired size and shape. Notwithstanding the different conductivity-type regions 10 and 12 and/or 14, the epitaxial layer 8 is a single layer of monocrystalline silicon. The desired doping configuration of the epitaxial layer 8 is achieved, according to the present invention, by ion implanting the desired conductivity-type-determining impurities in preselected regions of the growing epitaxial layer 8. Discrete doping of the growing epitaxial layer may be carried wholly by ion implantation or by a combination of implantation in discrete regions and the aforementioned vapor-phase-doping in conjunction with the epitaxial growth process. In ion implantation the impurity atoms, which are otherwise of neutral electrical charge or polarity, are given a predetermined electrical charge or are ionized. Such charged impurity atoms are therefore referred to herein as ions. By means of electrical fields, these ions may be formed into beams of various cross-sectional diameters and shapes and may also be caused to travel in pre-determined directions at pre-determined velocities much like the electrons in an electron beam. Instead of drifting into the lattice structure of the growing epitaxial layer in random fashion and directions, these ions enter the growing lattice structure in a predetermined direction and may be positioned where desired therein. In addition, the concentration of impurities in the growing epitaxial layer may be readily controlled or graded throughout the implanted region as desired. To sum up, ions of a desired conductivity-type-determining impurity may be made to enter a growing epitaxial layer in a fixed and desired direction with little or no deviation therefrom and may be placed therein where desired to establish a region of given conductivity type of any desired geometry and depth.

Figure 3:
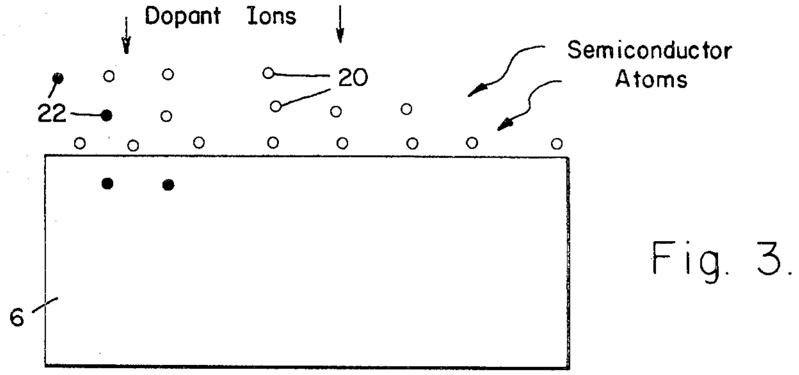
FIG. 3 is a schematic view of a substrate member on which an epitaxial layer is being grown and which is being simultaneously doped by ion implantation according to the method of the present invention.

With particular reference to FIG. 3, the process of the present invention is schematically shown with white dots 20 representing atoms of the semiconductor material being epitaxially-deposited as a crystalline extension of the crystal structure of the substrate 6. Black dots 22 represent the dopant ions being deposited from an ion beam into the growing crystal lattice structure so as to establish the desired conductivity type at this region of the crystal structure. Some of the dopant ions such as those designated by reference numeral 22' may have sufficient energy so as to sail into surface and near surface portions of the substrate body 6. Such penetration into the substrate body may occur until the growing epitaxial structure is sufficiently thick to prevent peneration therethrough by the ions.

To carry out the process of the present invention the substrate 6 is placed in suitable apparatus adapted to contain therein means for permitting the growth of an epitaxial layer and means for generating a beam of dopant ions. The process is carried out in vacuum. The apparatus includes means for heating the substrate member 6 to the appropriate temperature to facilitate the growth of the epitaxial layer thereon as described previously. For the purposes of the present invention a typically suitable ion source is shown and described in the co-pending application of R. G. Wilson et al., S.N. 640,441, filed May 16, 1967, and entitled "Surface Ionization Apparatus" and assigned to the instant assignee. More than one such ion source may be provided in the apparatus so as to permit the simultaneous formation of discrete regions of different conductivity type. It will be understood that one ion source could be used, for example, to generate a beam of N-type impurity ions and another ion source could be utilized to generate a beam of P-type impurity ions.

Figure 4:
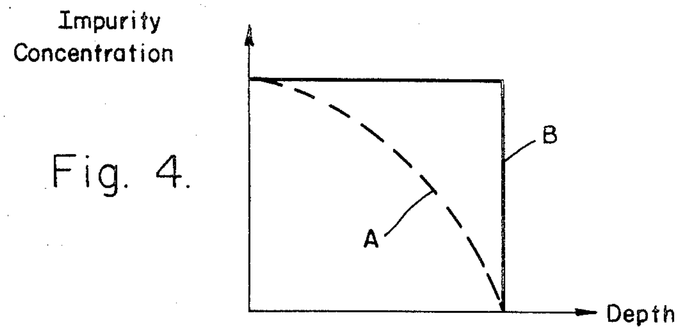
FIG. 4 is a diagram in which impurity concentration in a semiconductor body is plotted against distance into the semiconductor body.

With particular reference now to FIG. 4, the curves A and B denote the impurity concentration obtainable by the well known diffusion process and by the ion implantation process respectively. Heretofore the attainment of discrete regions in an epitaxially-grown layer has been accomplished by masking portions of the epitaxial layer after it has been grown and forming openings in the mask and then diffusing through this opening or openings an impurity of the desired type of conductivity. One of the disadvantages of the diffusion process is that the diffusion proceeds equally in all directions and particularly laterally as well as depth wise. Another disadvantage of the diffusion process, as shown by curve A in FIG. 4, is that the concentration of impurity decreases with the depth of penetration into the semiconductor body. Hence, diffused regions are of graded concentration and abrupt junctions between diffused regions and other regions of different conductivity are difficult, if not impossible, to obtain. On the other hand, it is possible to form an abrupt junction, as shown by curve B in FIG. 4, by the process of implanting impurities by ion implantation. This follows because, as explained previously, impurity atoms may be implanted by the ion implantation process to any depth and location and concentration within the semiconductor crystal lattice structure. Hence, one can implant or dope a given region of a semiconductor body to any prescribed depth and concentration.

Thus, the process of the present invention is of extreme importance for use in the fabrication of devices where hyper-abrupt junctions are necessary. In diode devices, for example, such abrupt junctions permit the diodes to operate with more effective rectification characteristics. In transistor devices the emitter efficiency is dependent upon the abruptness of the junction. In addition, the ability to form abrupt junctions perimts one to attain greater control of the base width in transistor devices.

Figure 5:
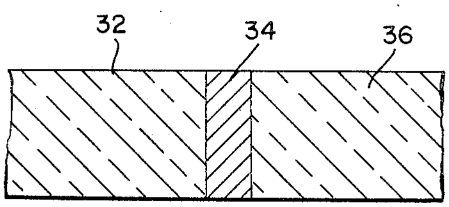
FIG. 5 is a partial, cross-sectional elevational view of a metal-base transistor.

A particular device which may be fabricated to greater advantage than heretofore attainable by the methods of the prior art is the metal-base transistor such as shown in FIG. 5. This transistor consists essentially of two N-type silicon portions 32 and 36 having a layer 34 of gold and silicon therebetween. The gold-silicon layer 34 may be termed a gold-silicide layer. Since the second silicon portion 36 is epitaxially grown, the gold layer 34 heretofore was heated in order to form a gold-silicide layer upon which the epitaxial silicon layer 36 would grow. The necessity for this step will be appreciated when it is remembered that an epitaxial layer will only grow upon a single crystalline substrate. One of the defects of the methods of the prior art in forming this device lay in the large number of pinholes formed in the gold-silicide layer 34 due to the process utilized to form this layer. These pinholes gave rise to very irregular characteristics since in some portions the arrangement was that of silicon-gold-silicon and in other portions where pinholes existed the arrangement is silicon-silicon.

With reference to FIGS. 6(*a*) through 6(*c*), the fabrication of such a metal-base transistor may be achieved according to the process of the present invention as follows. A substrate member 32 of N-type silicon is disposed in the ion implantation-epitaxial growth apparatus as described previously and a layer 38 of gold and silicon is epitaxially grown on a predetermined surface of the substrate member 32. More specifically a silicon epitaxial layer is grown by the epitaxial process simultaneously with the implantation therein of gold atoms by ion implantation. When the desired thickness of the gold-silicon layer 38 is attained, the gold ion implantation is terminated and the growth of the silicon layer by the epitaxial process is continued until a silicon body 34 of the desired geometry and size is obtained. The N-type silicon layer 34 may be obtained by doping the epitaxial layer 34 by the methods of the prior epitaxial process or may be obtained by implanting antimony atoms, for example, by ion implantation in the growing epitaxial region. To achieve the latter operation it would be necessary to include two ion sources in the apparatus, one for generating the beam of gold ions and one for generating the beam of the N-type impurity ions.

Another device which may be fabricated to advantage by the process of the present invention is the varactor diode 40, the essential portions of which are shown in FIG. 7. It will be understood that a varactor diode is a semiconductor diode comprising a semiconductor body which includes a P-N junction whose capacitance is highly sensitive to the voltage across the junction according to the expression $C^n \propto 1/V$, where C is the capacitance and V is the voltage. Such devices operate as voltage variable capacitors from which the term "varactor" is derived. The larger the rate of change of capacitance with a change in voltage, the higher is the figure of merit for such a device. In the case of diffused junction varactor diodes the capacitance-voltage relationship may be generally expressed by $C^3 \propto 1/V$ while in the case of alloyed junction devices the relationship may be expressed as $C^2 \propto 1/V$. This rate of change of capacitance may be optimized and made more linear by the establishment of a hyper-abrupt junction. As shown in FIG. 7 the diode comprises, for example, an N-type substrate 42 of high conductivity on which is grown an N-type epitaxial layer 44 of lower conductivity having in turn a P-type epitaxial layer 46 disposed thereon. It is desired that the P-N junction formed between the N and P-type epitaxial layers 44 and 46 be abrupt. To fabricate such a device according to the present invention the N-type layer 44 is first grown on the N+ substrate 42 by the ion implantation-epitaxial process of the invention. Upon the attainment of the N-type layer 44 of the desired physical and electrical characteristics, implantation by the ion implantation process of the N-type impurity ions is ceased and implantation of P-type impurities is commenced while continuing the epitaxial growth process. The capacitance-voltage relationship for a varactor diode made according to the invention is equivalent to $C^2 \propto 1/V$.

In FIG. 8 another device is shown which may be fabricated with advantage according to the process of the present invention. This device 50 comprises a semiconductor body 54 of a given type of conductivity which may be epitaxially grown on a substrate member 52. Embedded or "buried" within the epitaxial layer 54 is a region 56 of opposite conductivity type to that of the surrounding region 54 so as to form therein a P-N rectifying junction. The embedded region 56 may be provided with an extension to a surface of the epitaxial layer 54 for the purposes of obtaining electrical connection to the embedded region 56. To achieve this structure reference is made to FIGS. 9*a* through 9*c*. The substrate 52 is disposed in an ion implantation-epitaxial growth apparatus and an N-type epitaxial layer 54' is grown thereon by implanting N-type impurity atoms into the growing epitaxial layer until the desired thickness of this layer is achieved. Thereafter, while continuing the epitaxial growth of the semiconductor material, a P-type ion implantation source is activated and a portion of the growing epitaxial layer is implanted with P-type ions. Growth of the N-type epitaxial layer is continued by irradiating adjacent portions 54'' with ions of the N-type impurity. After the attainment of a P-type region 56 of the requisite goemetry and size, the P-type ion source may be deactivated while maintaining epitaxial growth and irradiating the continuing growing portions 54''' with the N-type impurity ions. If it is desired to provide the buried P-type region 56 with a surface contact portion, implantation of P-type ions may be restricted during the final phase of the epitaxial process to the region 56'. In this final phase of the epitaxial growth, there are thus two simultaneous ion implantations occurring: one of the N-type impurity to form the N-type epitaxial region 54''' and one of P-type impurity to form the P-type contact region 56'.

There thus has been described a novel and exceptionally useful and versatile method for fabricating semiconductor devices by the epitaxial growth process. By the method of the invention not only can one selectively establish any particular kind of conductivity in an epitaxially grown semiconductor film, but one can also fabricate devices having more abrupt junctions than heretofore possible.

What is claimed is:

1. The method of forming a semiconductor member comprising the steps of:

(a) forming in vacuum a vapor of semiconductor material;

(b) depositing semiconductor material on a substrate member from said vapor to form thereon an epitaxially grown layer;

(c) and bombarding at least a selected portion of said layer with ions of a second material while said semiconductor material is being deposited.

2. The method according to claim 1 wherein said second material is a conductivity-type-determining impurity.

3. The method of fabricating a semiconductor member comprising the steps of:

(a) forming in vacuum a vapor of semiconductor material;

(b) providing in said vacuum substrate member of the same kind of semiconductor material as said vapor;

(c) heating said substrate member to a predetermined temperature below the melting point of said semiconductor material;

(d) depositing semiconductor material on said substarte member from said vapor to form thereon by epitaxial growth a layer of said semiconductor material;

(e) and bombarding at least a selected portion of said layer with ions of a second material while said semiconductor material is being deposited.

4. The method according to claim 3 wherein said second material is a conductivity-type-determining material.

References Cited

UNITED STATES PATENTS

| | | | |
|---|---|---|---|
| 3,117,022 | 1/1964 | Bronson et al. | 117—93.3 XR |
| 3,293,084 | 12/1966 | McCaldin | 148—1.5 |
| 3,388,009 | 6/1968 | King | 148—1.5 |
| 3,390,019 | 6/1968 | Manchester | 148—1.5 |
| 3,392,056 | 7/1968 | Maskalick | 117—106 XR |
| 3,413,531 | 11/1968 | Leith | 317—235 |

L. DEWAUNE RUTLEDGE, Primary Examiner

W. G. SABA, Assistant Examiner

U.S. Cl. X.R.

29—578; 117—93.3; 148—1.5, 33; 317—235